UNITED STATES PATENT OFFICE.

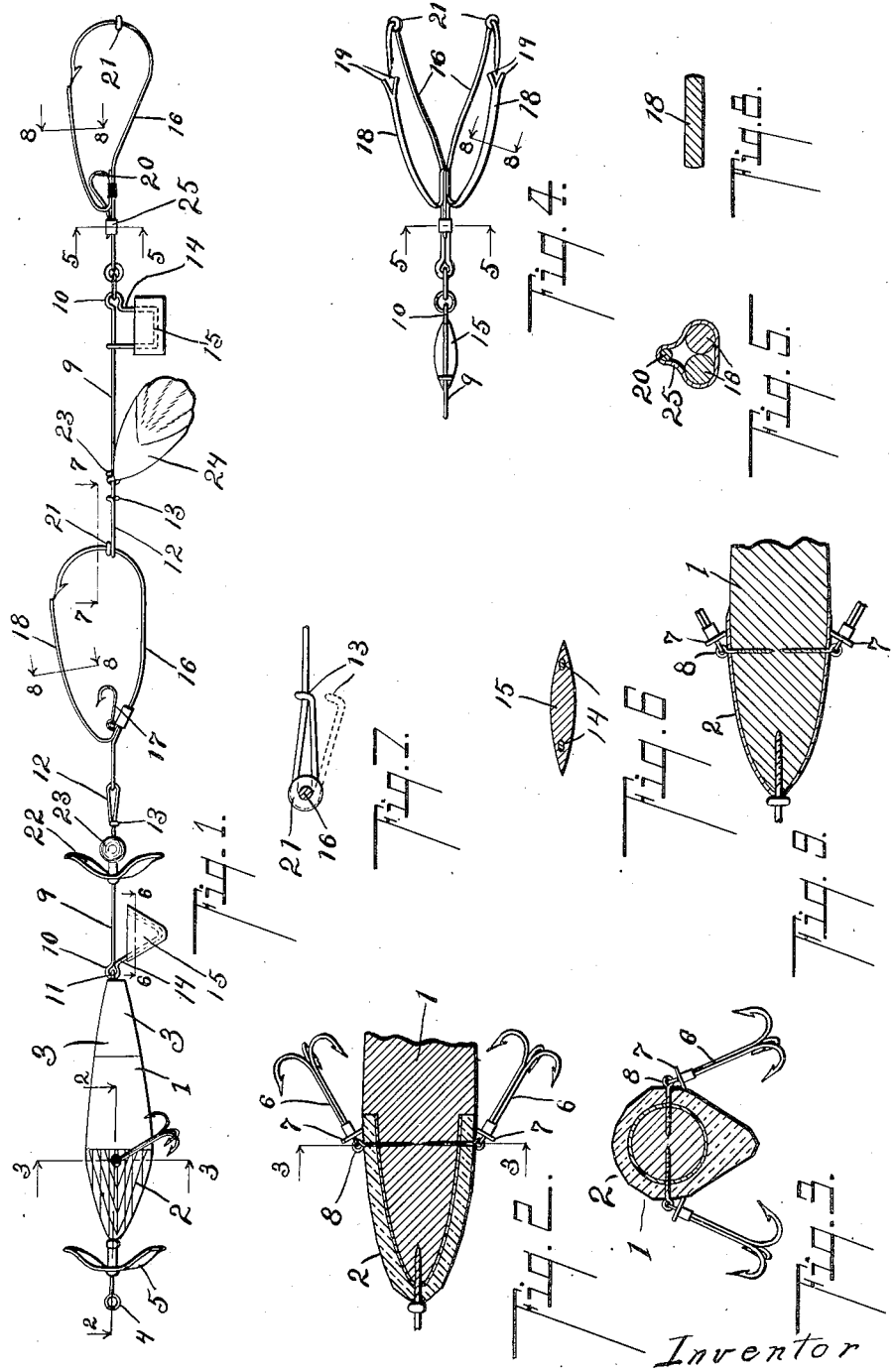

HENRY W. BUSCHEMEYER, OF KALAMAZOO, MICHIGAN.

FISH BAIT OR LURE.

No. 887,765.　　　　Specification of Letters Patent.　　　Patented May 19, 1908.

Application filed July 1, 1907. Serial No. 381,586.

*To all whom it may concern:*

Be it known that I, HENRY W. BUSCHEMEYER, a citizen of the United States, residing in the city and county of Kalamazoo, State of Michigan, have invented certain new and useful Improvements in Fish Baits or Lures, of which the following is a specification.

This invention relates to improvements in fish baits or lures.

The main objects of this invention are, first, to provide an improved fish bait or lure having a train of trailing hooks and spoons. Second, to provide an improved fish bait or lure having a train of trailing hooks which are arranged so that they are maintained in their proper position when in use, and are not likely to become entangled with each other. Third, to provide improved decoy devices for such baits or lures. Fourth, to provide in a fish bait or lure an improved arrangement of the sinker. Fifth, to provide in a fish bait or lure an improved means of securing and supporting the hooks.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which, Figure 1 is a side elevation of my improved fish bait or lure. Fig. 2 is an enlarged horizontal section taken on a line corresponding to line 2—2 of Fig. 1, showing the manner of securing the hooks of the body 1, and showing a glass cap on the front end of the bait body. Fig. 3 is a vertical transverse section taken on a line corresponding to line 3—3 of Figs. 1 and 2. Fig. 4 is a plan of the rear trailing hook. Fig. 5 is an enlarged section taken on a line corresponding to line 5—5 of Figs. 1 and 4, showing structural details. Fig. 6 is an enlarged detail section through the sinker, taken on a line corresponding to line 6—6 of Fig. 1. Fig. 7 is an enlarged section taken on a line corresponding to line 7—7 of Fig. 1. Fig. 8 is a cross section taken on a line corresponding to line 8—8 of Figs. 1 and 4, showing the form of the hook guards. Fig. 9 is a sectional view, similar to Fig. 2, illustrating a metal cap for the head of said body.

In the drawing, similar reference characters refer to similar parts throughout the several views, and the sectional views are taken looking in the direction of the little arrows at the ends of the section lines.

Referring to the drawings, the body 1 is preferably formed of wood and is provided with glass or metal head and tail caps 2 and 3, respectively, these caps being preferably of glass cut prismatically and lined with bright metal and luminous material. If metal is used, it should be polished and bright. The body is provided with a line-attaching rod 4 at its forward end, having a suitable eye therein. The forward spinner 5 is preferably mounted on this rod. The hooks 6 which are preferably of the triple type, as illustrated, are secured preferably by means of the screw eyes 8 to the sides of the body, the screw eyes being arranged through the metallic head cap 2 or tail cap 3. On the shanks of the hook and adjacent to the eyes thereof are disk-like collars 7, which engage or rest against the body, or rather the cap-piece 2 thereof when arranged as shown in the structure, and thereby the hooks are held out away from the body so that they are in position to effectively receive the strike of the fish, and also so that the points of the hooks do not engage and abrade the body 2 or become entangled with each other.

The trailing hook 16 is detachably secured to the tail of the body by means of a coupling 9 preferably formed of wire. This coupling is provided with an eye 10 at its forward end engaged in the eye 11 in the rearward end of the body, 1. At the rear end of the coupling is an eye 12 formed by looping the wire upon itself and engaging the hook 13 around the wire. This hook is like that detailed in Fig. 7.

The coupling 9 is provided at its forward end with a downwardly-extending arm 14 on which the sinker 15 is secured. This sinker serves as a weight or sinker for the body, maintaining the same right side up and avoiding the necessity of attaching the sinker directly to the body or of inserting a weight in the bottom thereof, as is the common practice.

The eye of the trailing hook 16 is engaged by the eye 12 on the coupling member 9. The hook 16 is preferably provided with a bait hook 17 secured at the forward end thereof, and with a guard 18, the said guard being in the form of a flat wire secured at its forward end to the shank of the hook and having forked rear ends 19, which lie normally in front of the hook. These guards are formed of flat strips of metal or flat wire so that they readily spring in and out, but do not readily spring in a lateral direction, thereby more effectively serving to guard the point of the hook, as the point of the hook can be protected by forking or notching the end of the guard as illustrated in Fig. 4.

The rear trailing hooks 16 are arranged in pairs side by side. These hooks are also provided with guards 18 arranged substantially the same as those for the hook described. The bait hook 20 is in this construction slightly modified, the shank of the bait hook being fixed rigidly instead of being secured by an eye as is shown for the first trailing hook. This bait hook 20 is arranged centrally between the pair of hooks, so that a single bait serves for both hooks. The bait hook 20 is formed of flexible material and is secured by means of a band 25 which is arranged to be slipped upon the ends of the same or removed therefrom when it is desired to open the hook. The bait hook is also arranged between the guards 18, so that the bait is protected thereby.

The rear trailing hooks are connected to the first trailing hook by means of the coupling member 9, substantially the same as described for connecting the trailing hook to the body, the eye 12 of the coupling member engaging the forward hook.

To prevent the coupling member from stripping the bait from the forward trailing hook or from tending to release a fish which may be hooked by the forward trailing hook, I provide the forward trailing hook with a fixed collar or bead 21 back of which the eye of the coupling 9 is engaged. This allows a freedom of movement of the hooks relative to each other but prevents the stripping of the forward hook by the coupling member.

The rear coupling 9 is also preferably provided with a sinker 15 so that the rear hook is held right side up, and its spinning or twisting prevented. The coupling members are preferably provided with a spinner 22, as shown on the forward coupling member, or with a whirling spoon, as 24, as shown on the rear coupling member, by which arrangement I secure a lure which is very attractive having artificial attractions as well as the natural baits which may be placed thereon.

For some purposes it may be desirable to remove the rear trailing hook or both trailing hooks, and I therefore make them readily detachable by means of the eyes 12 described. Suitable rings may be interposed between the various parts where the same come to improper angles to secure the proper relation of the different hooks and lures. See Fig. 4.

While I have illustrated and described my improved lure in detail in the form preferred by me on account of its structural simplicity and economy, I am, however, aware that it is capable of considerable variation in structural details without departing from my invention, and I desire to be understood as claiming the same broadly as well as specifically, as illustrated.

Having thus described my invention, what I claim as new and desire to secure by Letters Patent is:

1. A fish bait or lure consisting of the combination of a body; hooks thereon; disk-like collars on the shanks of said hooks to support the same outwardly away from the said body to prevent the points contacting therewith; trailing devices with hooks secured thereto; suitable connections securing the trailing device to the rear end of said body; depending arms from said trailing devices rigidly secured thereto, with weights or sinkers formed thereon; flat spring guards secured to the shanks of said hooks and curved into proximity with the points thereof, being suitably notched to embrace the points of the hooks; and suitable spinners at intervals, all coacting substantially as described and for the purpose specified.

2. The combination with a pair of hooks arranged one to the rear of the other, the forward hook having a stop bead back of the barbs, of a coupling for said hooks having an eye through which the forward hook is arranged, embracing said hook back of said stop bead; a spinner on said coupling; and a weight on said coupling for preventing the rotation of the parts with the spinner.

3. In a fish bait or lure, the combination of a suitable float body; a train of hooks back of the same; spinners arranged between the said hooks; and balancing weights to prevent the rotation of the parts, coacting for the purpose specified.

4. A fish bait or lure, consisting of the combination of a body; hooks thereon; disk-like collars on the shanks of said hooks to support the same outwardly away from the said body to prevent the points contacting therewith; trailing devices with hooks secured thereto; suitable connection securing the trailing device to the rear end of said body; depending arms from said trailing devices rigidly secured thereto, with weights formed thereon; and suitable spinners at intervals on the said couplings, all coacting substantially as described and for the purpose specified.

5. A fish bait or lure consisting of the combination of a body; hooks thereon; trailing devices with hooks secured thereto; suitable connections securing the trailing device to the rear end of said body; depending arms from said trailing devices rigidly secured thereto, with weights or sinkers formed thereon; flat spring guards secured to the shanks of said hooks and curved into proximity with the points thereof, being suitably notched to embrace the points of the hooks; and suitable spinners at intervals on said connections, all coacting substantially as described and for the purpose specified.

6. A fish bait or lure consisting of the combination of a body; hooks thereon; trailing devices with hooks secured thereto; suitable connections securing the trailing device to the rear end of said body; depending arms from said trailing devices rigidly secured thereto, with weights or sinkers formed thereon; and suitable spinners at intervals on said connections, all coacting substantially as described and for the purpose specified.

7. A fish bait or lure consisting of the combination of a body; hooks thereon; disk-like collars on the shanks of said hooks to support the same outwardly away from the said body to prevent the points contacting therewith; trailing devices with hooks secured thereto; suitable connections securing the trailing device to the rear end of said body; depending arms from said trailing devices rigidly secured thereto, with weights or sinkers formed thereon; and flat spring guards secured to the shanks of said hooks and curved into proximity with the points thereof, being suitably notched to embrace the points of the hooks, all coacting substantially as described and for the purpose specified.

8. A fish bait or lure consisting of the combination of a body; hooks thereon; disk-like collars on the shanks of said hooks to support the same outwardly away from the said body to prevent the points contacting therewith; trailing devices with hooks secured thereto; suitable connections securing the trailing device to the rear end of said body; and depending arms from said trailing devices rigidly secured thereto, with weights or sinkers formed thereon, all coacting substantially as described and for the purpose specified.

9. A fish bait or lure consisting of the combination of a body; hooks thereon; trailing devices with hooks secured thereto; suitable connections securing the trailing device to the rear end of said body; depending arms from said trailing devices rigidly secured thereto, with weights or sinkers formed thereon; and flat spring guards secured to the shanks of said hooks and curved into proximity with the points of the hooks, all coacting substantially as described and for the purpose specified.

10. A fish bait or lure consisting of the combination of a body; hooks thereon; trailing devices with hooks secured thereto; suitable connections securing the trailing device to the rear end of said body, and depending arms from said trailing devices rigidly secured thereto, with weights or sinkers formed thereon, all coacting substantially as described and for the purpose specified.

11. In a fish bait or lure, the combination with the body, of a metal cap for the head end thereof; hooks; disk-like collars secured to the shanks of said hooks adjacent to the eyes thereof; and screw eyes for securing said hooks to said body arranged through the said head cap thereof, whereby the said hooks are supported and the points thereof held outwardly from the said body.

12. In a fish bait or lure, the combination with the body, of hooks secured thereto; a trailing hook; a coupling for securing said trailing hook to said body, said coupling being pivotally secured at the rear end of said body and having a downwardly-projecting arm at its forward end; a weight secured to said arm; and a spinner mounted upon said coupling.

13. In a structure of the class described, the combination with a pair of hooks arranged one at the rear of the other, of a coupling rod therefor; a spinner arranged on said rod; and a balancing weight on said coupling to prevent the rotation of the parts.

14. In a fish bait or lure, the combination of a body; a plurality of trailing hooks arranged in a train; a coupling for the forward end of said hooks to the rear end of said body; a coupling for the rear hook to the forward hook; a collar on the forward hook for limiting the movement toward the point of the hook of said coupling member thereon; weights depending from said couplings; and revoluble members mounted on said couplings.

15. The combination with a pair of hooks arranged one to the rear of the other, the forward hook having a stop bead back of the barbs, of a coupling for said hooks having an eye to which the forward hook is arranged, embracing said hook back of said stop bead and a spinner on said coupling.

16. In a structure of the class described, the combination with a pair of hooks arranged one at the rear of the other, of a coupling rod therefor, and a spinner arranged on said rod.

17. A fish bait or lure consisting of the combination of a body; hooks thereon; disk-like collars on the shanks of said hooks to support the same outwardly away from said body to prevent the point contacting therewith.

18. A fish bait or lure consisting of the combination of a body part, a glass cap for the end of said body portion, having a prismatic-cut surface and luminous lining.

19. The combination of a series of hooks, arranged to trail one behind the other, the forward hook having a stop-bead back of the barb and in the curved portion; a coupling from the rear hook to the forward hook, having an eye which embraces the forward hook back of the said bead, to prevent the said eye swinging into contact with the barb of the forward hook, whereby the rear hook is flexibly connected to the forward hook.

20. The combination of a series of hooks, arranged to trail one behind the other, the forward hook having a stop-bead back of the barb and in the curved portion; a coupling from the rear hook to the forward hook, having a detachable eye which embraces the forward hook back of the said bead, to prevent the said eye swinging into contact with the barb of the forward hook, whereby the rear hook is flexibly connected to the forward hook.

In witness whereof, I have hereunto set my hand and seal in the presence of two witnesses.

HENRY W. BUSCHEMEYER. [L. S.]

Witnesses:
LULU GREENFIELD,
GERTRUDE TALLMAN.